United States Patent [19]
Lavallee et al.

[11] 4,355,860
[45] Oct. 26, 1982

[54] DOUBLE PASS SCANNING SYSTEM

[75] Inventors: Pierre A. Lavallee, Penfield; Sidney W. Marshall; Ronald L. Antos, both of Webster, all of N.Y.

[73] Assignee: Xerox Corporation, Stamford, Conn.

[21] Appl. No.: 191,796

[22] Filed: Sep. 29, 1980

[51] Int. Cl.³ .......................................... G02B 27/17
[52] U.S. Cl. .................................................. 350/6.8
[58] Field of Search ................. 350/6.8; 358/206, 293, 358/294; 364/173 R

[56] References Cited

U.S. PATENT DOCUMENTS

| | | | |
|---|---|---|---|
| Re. 29,067 | 12/1976 | Watson | 178/7.1 |
| 3,752,558 | 8/1973 | Lloyd | 350/6 |
| 3,898,627 | 7/1975 | Hooker et al. | 364/900 |
| 4,054,361 | 10/1977 | Noguchi | 350/6.8 |
| 4,054,928 | 10/1977 | Butler et al. | 360/79 |
| 4,058,828 | 11/1977 | Ladd | 358/80 |
| 4,179,183 | 12/1979 | Tateoka et al. | 350/6.1 |
| 4,213,157 | 7/1980 | De Benedict | |
| 4,232,964 | 11/1980 | Nodov et al. | 358/293 |
| 4,258,395 | 3/1981 | Nodov | 358/293 |
| 4,274,703 | 6/1981 | Fisli | 350/6.8 |
| 4,284,994 | 8/1981 | Radl | 350/6.8 |

Primary Examiner—John K. Corbin
Assistant Examiner—Rebecca D. Gass
Attorney, Agent, or Firm—Frederick E. McMullen

[57] ABSTRACT

A raster scanner with laser for generating a scanning beam and compact, folded optical system for transmitting the beam to the object to be scanned. The optical system includes a first mirror for guiding the laser beam forward along a downwardly inclined slope to the modulator, a second mirror below the modulator for intercepting the beam from the modulator and folding the intercepted beam to guide the beam backwards along a horizontal plane to a third mirror which folds the beam and guides the beam forward along an upwardly inclined slope against the mirrored facets of a rotating polygon, the polygon scanning the beam through a preset scan arc and returning the beam via a focusing lens to the third mirror, the third mirror folding the scan beam and guiding the scan beam forward, and a fourth mirror for intercepting the scan beam and guiding the beam to the object to be scanned.

6 Claims, 10 Drawing Figures

FIG. I

DOUBLE PASS SCANNING SYSTEM

This invention relates to raster scanners, and more particularly to a raster scanner incorporating a compact folded optical system.

In raster type scanners which may, for example be used to write images on the photoconductor of a xerographic apparatus for subsequent development and transfer to a copy substrate material, typically employ a laser as the source of the scanning beam. An optical system which includes a rotating, scanning polygon sweeps the beam across the object being scanned as for example the aforementioned photoconductor. In the case where the scanner serves to produce or write images, a modulator is disposed astride the beam path to vary the intensity of the beam in accordance with video image signals input thereto.

In scanners of the aforementioned type, the optical tolerances are extremely close in order to assure that a beam of the requisite size and intensity strikes the object being scanned and the correct image contrast, size, orientation, etc. is achieved.

However, the optical requirements needed to meet the strict optical tolerance levels required may dictate a relatively elaborate optical path in order to meet the operational constraints imposed by the various optical components, and particularly the scanning polygon, lens, and beam modulator. And if the original intent was to design a relatively compact and inexpensive raster scanner, the particular dimensional and component interrelationships imposed may instead result in a scanner of a size and/or cost substantially greater than that envisioned or desired originally.

This invention relates to a symmetrical optical system for a raster scanner which minimizes the need for cross scan corrections and avoids the use of a torroid type lens. The system includes a plurality of reflective surfaces cooperable to form an optical path for causing a beam of high intensity energy to impinge on the object to be scanned, the reflective surfaces including a rotatable deflector for scanning the beam through a preset scan arc, and at least one fold mirror for guiding the beam to the deflector, the deflector reflecting the beam back to the fold mirror whereby to provide a dual pass optical path between the deflector and the fold mirror.

Other objects and advantages will be apparent from the ensuing description and drawings in which.

Figure 1:
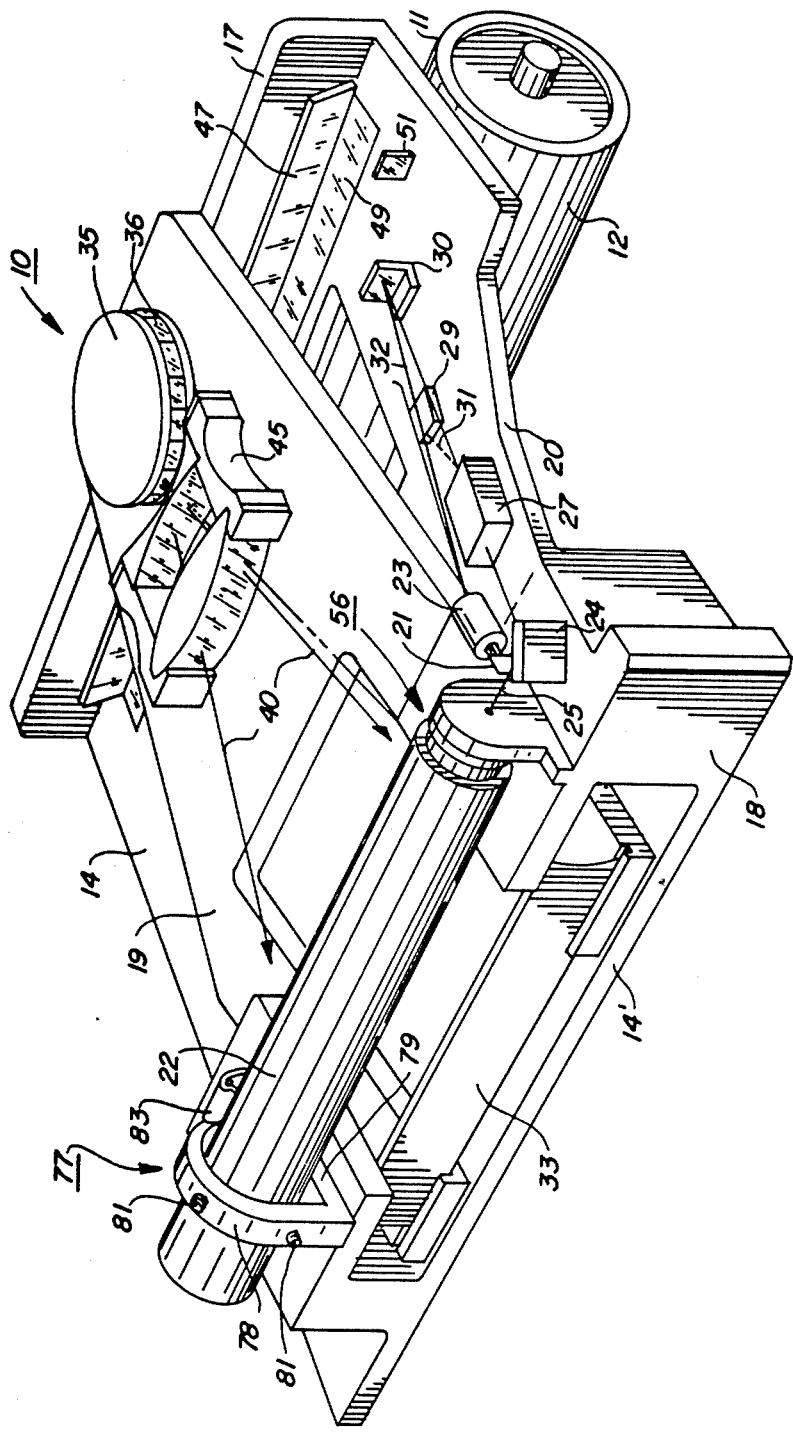
FIG. 1 is an isometric view of an exemplary laser driven raster scanner embodying the principles of the present invention.
Figure 2:
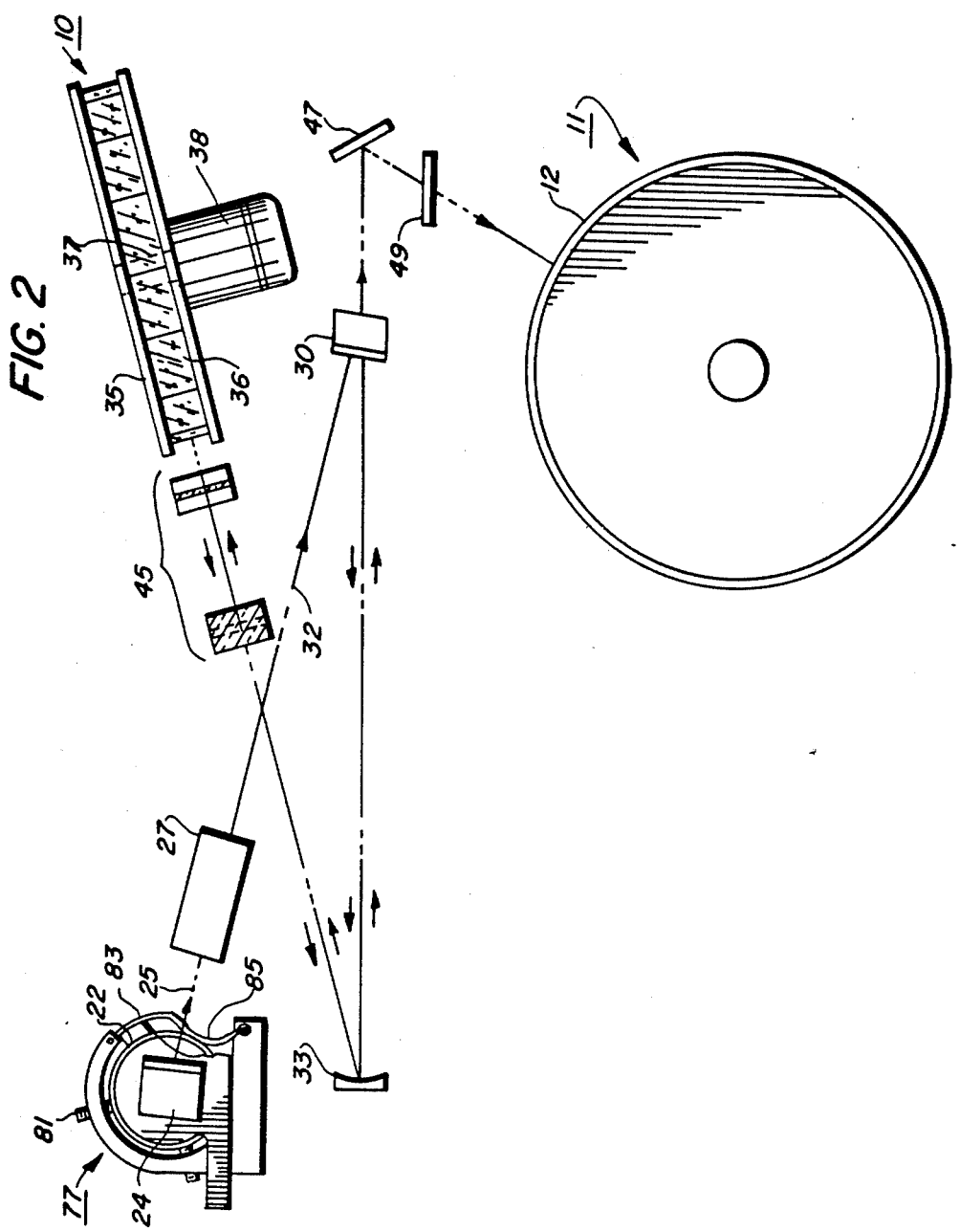
FIG. 2 is a side view of the scanner shown in FIG. 1.
Figure 3:
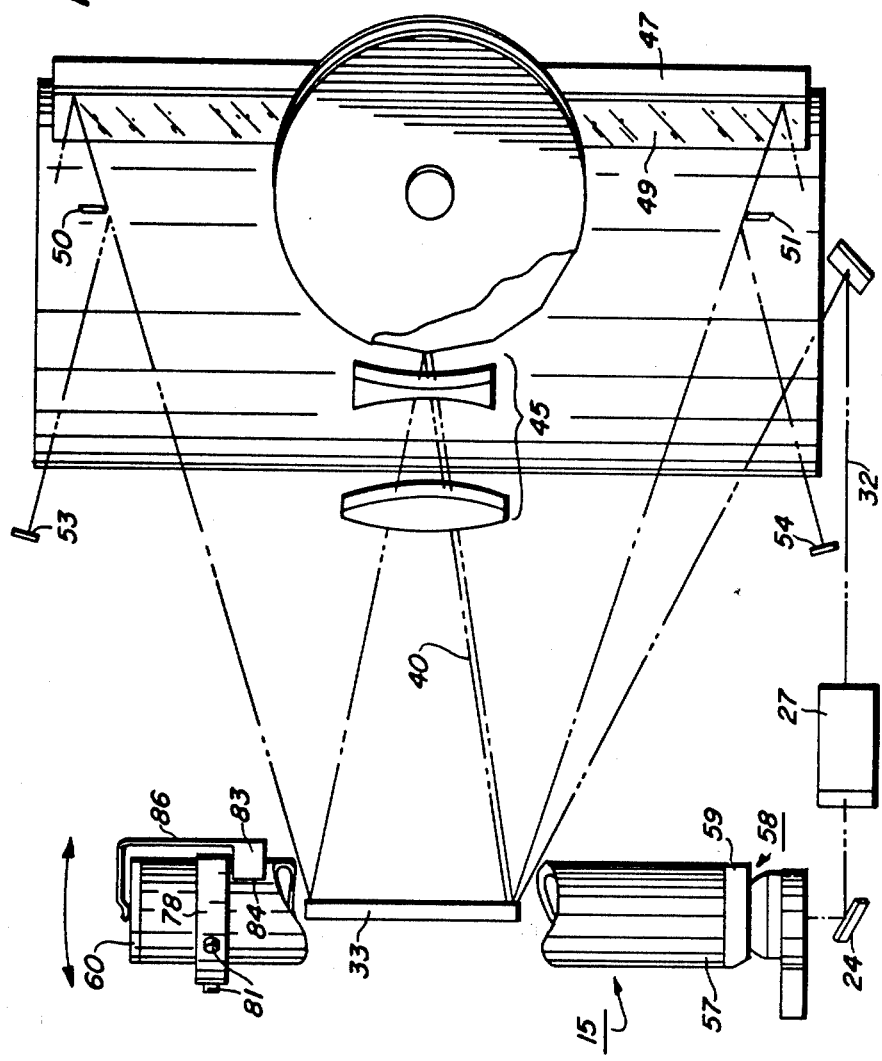
FIG. 3 is a top view of the scanner shown in FIG. 1.

Referring to FIGS. 1–3 of the drawings, a raster output scanner (ROS) 10 embodying principles of the present invention is thereshown. As will appear, scanner 10 generates latent electrostatic images on the photoconductive surface 12 of a xerographic member 11 (shown here in the form of a drum) of a xerographic system (not shown). As will be understood by those familiar with the xerographic arts, the latent electrostatic images are created on the previously uniformly charged photoconductive surface 12 through selective exposure thereof in response to image information in the form of video image signals or pixels input to modulator 27 of scanner 10. The latent electrostatic image so created is thereafter developed and the developed image transferred to a suitable copy substrate material i.e. a copy sheet. The transferred image is thereafter fixed to form a permanent copy.

Scanner 10 includes a generally rectangular base 14 on which the several components of scanner 10 are mounted in operative relation. Base 14 includes upright end supports 17, 18. A polygon bridge support 19 extends downwardly from the upper portion of end support 17 to edge 14' of base 14. An oppositely facing, downwardly inclined side support 20 extends along one side of base 14 from the corner area of end support 18 to the opposite end of base 14 proximate end support 17. The angle of inclination of bridge support 19 and side support 20 is chosen to accommodate system optical requirements and assure maximum compactness.

A suitable source of high intensity light such as a laser, Light Emitting Diodes (LEDs), Infra-Red (IR) laser diodes, etc. is provided. In the exemplary arrangement shown, a laser assembly is with laser plasma tube or laser 22 is mounted on end support 18 in a plane spaced above the plane of base 14. The longitudinal axis of laser assembly 15 generally parallels edge 14' of base 14 and end supports 17, 18. As will appear more fully herein, laser assembly 15 is mounted on end support 18 through an adjustable supporting mechanism which enables the beam of light output by laser 22 to be aligned with the scanner optical axis in the field by service personnel. A beam focusing lens 67 is provided to focus the laser beam internal to modulator 27, as will appear.

A movable shutter 21 is disposed adjacent the beam discharge side of laser assembly 15, shutter 21 serving to intercept the beam 25 emitted by laser 22 when scanner 10 is not in use. This permits laser 22 to be operated continuously, prolonging laser life. A solenoid 23 is provided for withdrawing shutter 21 when it is desired to operate scanner 10.

The scanner optical path O leading from the beam discharge end of laser assembly 15 to the photoconductive surface 12 includes a first beam folding mirror 24 mounted on end support 18 adjacent the laser output. Beam modulator 27 is disposed downstream of mirror 24 on the downwardly inclined side support 20. Mirror 24 intercepts the laser beam 25 and turns, (i.e. folds) the beam through an angle of approximately 90° (in the horizontal plane) and downwardly toward modulator 27. Modulator 27, which may comprise any suitable light modulator, as for example an acousto optic type modulator, selectively deflects the beam 25 to provide zero order and first order beams 31, 32 in accordance with the video image signal input thereto. A beam stop 29 on side support 20 intercepts the zero order beam 31. The first order beam 32 output by modulator 27 strikes a second beam folding mirror 30 mounted on side support 20 downstream of and below modulator 27.

Mirror 30 reflects the first order beam back toward laser 22 along a generally horizontal plane paralleling base 14 to a third power mirror 33. Mirror 33, which is supported on base 14 adjacent to and below laser 22, folds the beam 32 back and directs the beam upwardly along a path generally paralleling the surface of bridge support 19 toward polygon 35. As will be seen, the scanner optical path O is such that the beam reflected by mirror 33 passes through one side of lens 45 to strike the mirrored facets of scanning polygon 35.

Power mirror 33 comprises a cylindrical mirror with power in the cross-scan plane. Mirror 33 functions to aid focusing of the cross-scan beam waist onto the facets of scanning polygon 35. Lens 45 performs cross-scan focusing with the aid of power mirror 33 and collimates the beam in the polygon facet scan direction.

Scanning polygon 35 is supported on shaft 37 of polygon drive motor 38 which in turn, is suspended from the underside of bridge support 19, suitable bearing means (not shown) being provided to accommodate rotation of shaft 37 and the polygon 35 mounted thereon. The polygon/drive motor described preferably comprises a unitary assembly, the longitudinal axis of which, due to the mounting thereof on bridge support 19, is substantially perpendicular to the plane of bridge support 19. Inasmuch as bridge support 19 is inclined, the plane of rotation of polygon 35 is inclined and generally parallel with the plane of bridge support 19.

Polygon 35 has a plurality of mirror-like facets 36 formed on the periphery thereof, facets 36 reflecting the first order beam 32 impinging thereon through a predetermined scan arc as polygon 35 rotates to provide scan beam 40.

The scan beam 40 reflected by facets 36 of polygon 35, which is tangentially offset from first order beam 32, passes through imaging lens 45, lens 45 serving to focus the beam onto the photoconductive surface 12. Lens 45 is mounted on bridge support 19 downstream of polygon 35. The now focused scan beam 40 from lens 45 strikes mirror 33 which reflects the scan beam back along a plane substantially paralleling base 14 to a fourth beam folding mirror 47.

Mirror 47, which is mounted on base 14 adjacent end section 17, reflects the scan beam in a generally downward direction through slot-like aperture 49 in base 14 to the photoconductive surface 12 of the aforementioned xerographic system.

A pair of pickoff mirrors 50, 51 are mounted on base 14 in a position to intercept the scan beam 40 at the extremities of the beam sweep. Pickoff mirrors 50, 51 reflect the intercepted beam toward start of scan (SOS) and end of scan (EOS) detectors 53, 54 respectively, mounted on end support 18. SOS and EOS detectors 53, 54 comprise any suitable light sensors such as photodiodes adapted to generate a signal in response to the presence of light. The position of the cooperating pickoff mirrors 50, 51 and detectors 53, 54 control the length of the line sync (LS) period.

As used herein, line sync (LS) is the period required for scan beam 40 to travel from SOS detector 53 to EOS detector 54. An image line which, as will be understood, normally includes certain steady state signals or pixels before and after the image signals and pixels representing the particular image to enable erasure or margin areas by the scan beam 40, is normally equal in period to that of the line sync (LS) signal. Where the image line and line sync (LS) periods are not equal, compensating adjustments to the pixel clock frequency are automatically made to establish equilibrium, as will appear more fully herein.

Figure 4:
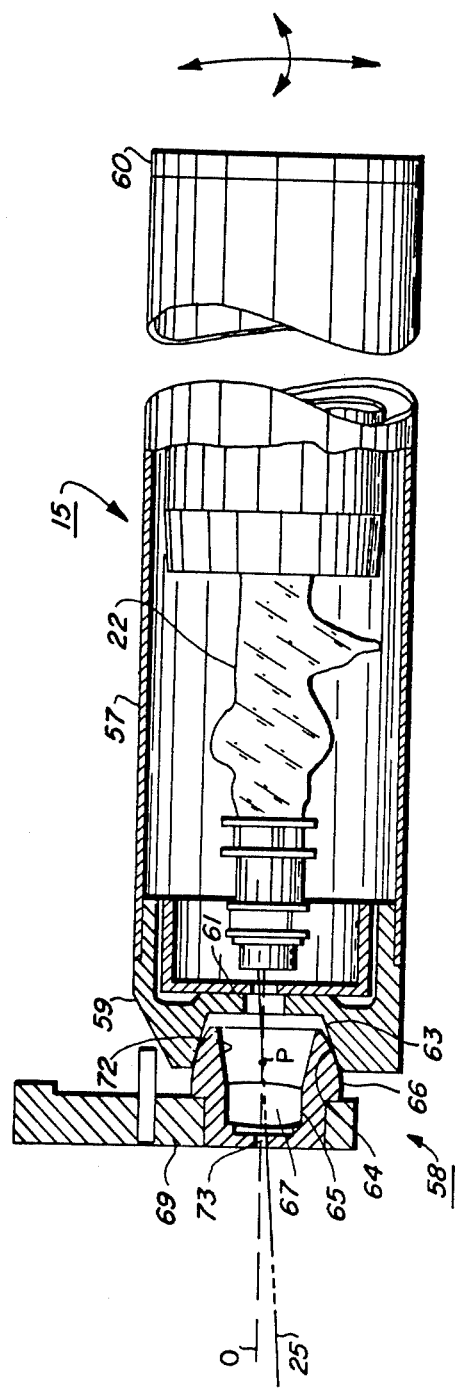
FIG. 4 is an enlarged view showing details of the laser supporting mechanism enabling field replacement and realignment of the laser following servicing or replacement thereof.

Referring to FIGS. 1-4, an adjustable support mechanism for laser assembly 15 permits servicing and/or removal and replacement of the laser assembly in the field. Referring particularly to FIG. 4, laser assembly 15 includes laser plasma tube 22 housed in an elongated cylindrical housing 57 having front and rear end caps 59, 60 respectively attached thereto. Front end cap 59 has an aperture 61 therethrough to enable the light beam 25 generated by laser 22 to pass to the scanner optical path. Front end cap 59 comprises one half of the spherical bearing 58 and for this purpose, the exterior surface of end cap 59 is provided with a conical bearing surface 63, forming bearing half 64. The mating half 65 of spherical bearing 58 is fixedly attached by mounting bracket 69 to end support 18 and has a spherically formed outer bearing surface 66 for mating engagement with the bearing surface 63 of bearing half 64. A tapered cylindrical recess 72 in bearing half 65 is coaxial with the optical axis O of scanner 15 and has a beam focusing lens 67 disposed therein. Aperture 73 in the wall portion 74 of the bearing half 64 behind lens 67 permits the laser beam from lens 67 to pass to the scanner optical system.

Bearing 58 serves as the front or forward support for the laser assembly 15, the bearing halves 64, 65 thereof mating together to permit rotation of laser assembly 15 about a point P coincident with the optical axis O of scanner 10 during alignment, as will appear.

Laser plasma tube 22 is fixedly disposed in housing 57 by suitable means (not shown) with the laser beam output therefrom prealigned to a preset point P. Point P comprises both a point on the optical axis O of a scanner 10 and a center of rotation of the spherical bearing 58 supporting the beam discharge end of the laser assembly in scanner 10. To enable point coincidence of the laser beam 25 with the optical axis O of scanner 10 to be achieved, the laser beam is accurately prealigned to the center of rotation of the spherical bearing 58, one half 64 of which is part of the laser assembly 15 and the other half 65 of which is a part of scanner 10 as described above. This permits the optical axis of scanner 10 and the axis of the laser beam to be brought into coincidence by pivoting the laser assembly about point P following joinder of bearing halves 64, 65.

Referring particularly to FIGS. 1-3, the opposite or rear end of housing 57 is received in and supported by a rear support member 77. Support member 77 comprises a generally semi-circular part 78 and supporting base 79, base 79 being fixedly secured to end support 18 as by means of screws (not shown). The semi-circular part 78 of support member 77 has radially disposed screw type members 81 at predetermined spaced distances along the periphery of segment 78, members 81 being abuttable with the outer periphery of housing 57 to adjust the relative position of laser assembly 15 in support member 77. As will be understood adjustment of screws 81 displaces the laser assembly 15 relative to the support member 77 and effectively pivots the laser assembly about point P when aligning the laser beam with the optical axis O of scanner 10.

A spring-like retainer 83 is pivotably secured to base 79 of support member 77. The opposite end of retainer 83 is adapted to lockingly engage pin 84 proximate the end of semi-circular part 78 of support member 77. Retainer 83 is formed with an inwardly curved segment 85 which engages the outer periphery of housing 57 on locking of retainer 83 into position to bias the housing 57 into abutment with adjusting members 81. A radially inward projecting resilient finger 86 is appended to retainer 83, finger 86 engaging rear end cap 60 to bias the laser assembly 15 forward and hold the bearing halves 64, 65 in mating engagement.

Figure 5:
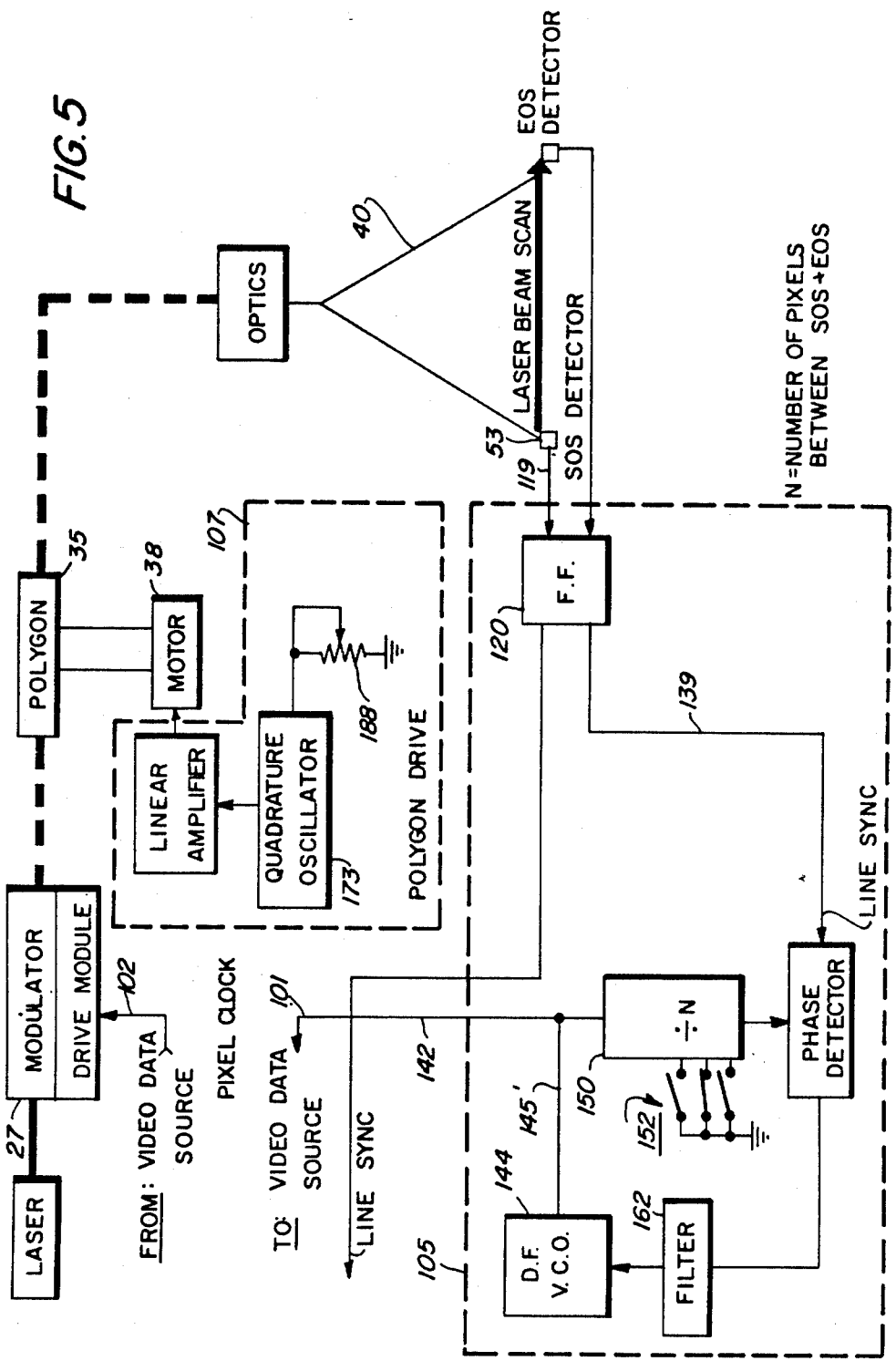
FIG. 5 is a block diagram of the scanner control.

Referring particularly to the control schematic of FIG. 5 of the drawings, video image signals from a suitable source (not shown) such as a raster input scanner, memory, communications channel, etc., are input to drive module 104 of modulator 27 via serial video data line 102. The serial stream of image signals are clocked through lead 102 to drive module 104 by clock signals generated by a pixel clock 105 and output, together with the line sync (LS) signal generated by SOS and EOS detectors 53, 54, to the video data source through lines 101, 142 respectfully. Polygon drive motor 38 is operated by polygon motor circuit 107, rotation of polygon 35 scanning the first order beam 32 across the photoconductive surface 12.

Video image signals are input to scanner 10 on a line by line basis, there being a pre-established number of pixels in each line. Between image scan lines and at the beginning and end of each line, a predetermined steady state video signal is provided to maintain a continuous first order beam and assure actuation of SOS and EOS detectors 53, 54 and erasing of non-image of background areas such as the side margins. Between the line sync (LS) signals, pixel clock 105 is interrupted, clock 105 incorporating means to start the clock synchronously with the laser beam's spatially sensed SOS position and thereafter gate the pixel clock off as the laser beam sweeps across EOS detector 54. The digital line sync (LS) signal, which is derived from the SOS and EOS detectors, synchronizes startup and stopping of the video data source with scanner 10.

Figure 6:
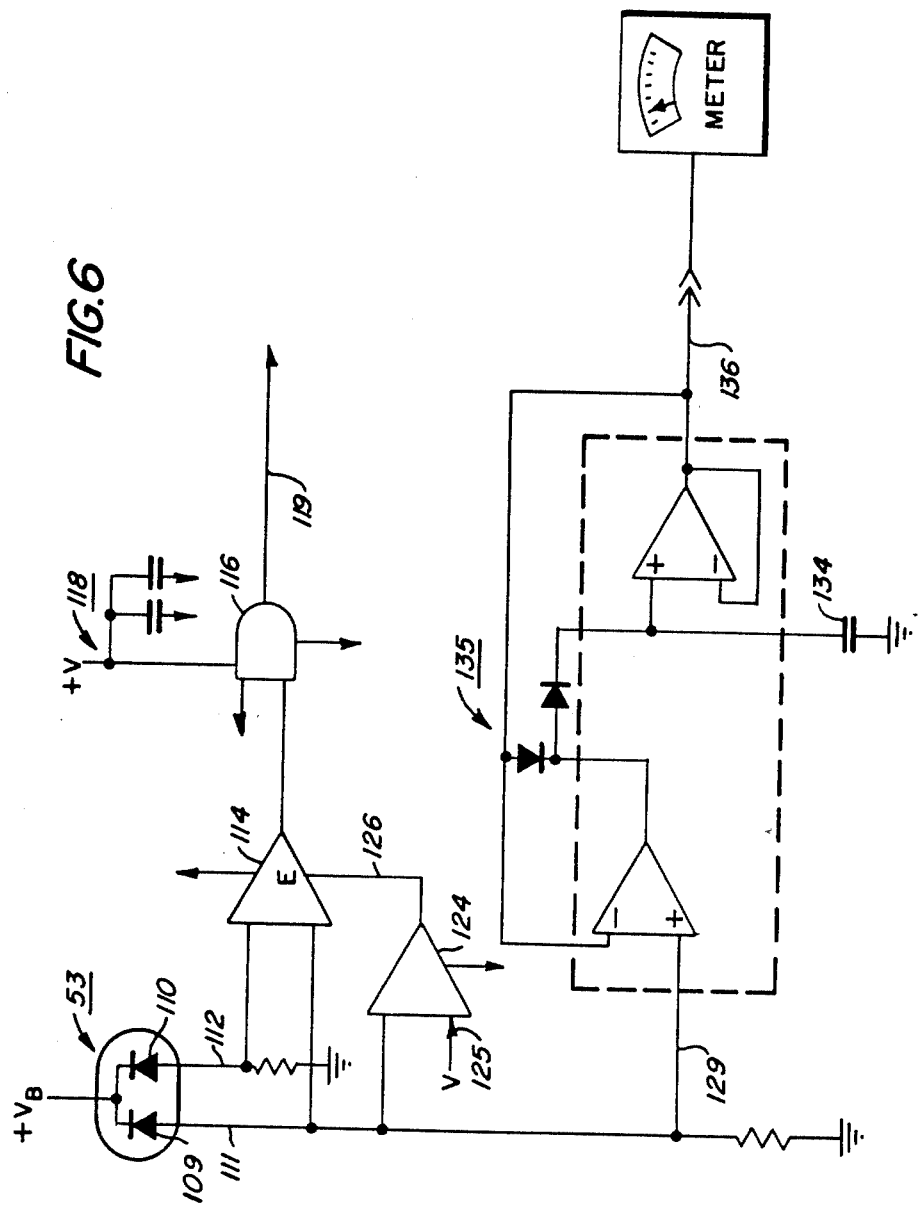
FIG. 6 is a logic circuit diagram showing details of the scanner detector circuit including a peak detection circuit enabling the scan detector to serve also as a light meter when aligning the laser.

Referring particularly to FIG. 6, SOS detector 53 comprises a dual photodiode detector such as a Model No. 20-10-583 detector made by Sensor Technology Inc.. As will be understood, each photodiode element 109, 110 generates a momentary signal wave as the laser beam passes across detector 53. The detector signals are output through lines 111, 112 to comparator 114, the latter responding to the point at which crossover between the falling signal output of the upstream photodiode element 109 and the rising signal output of the downstream photodiode element 110 occurs to enable gate 116 of line drive circuit 118. The output of circuit 118 is coupled to line sync (LS) flip-flop 120 (FIGS. 5, 7a) by line 119.

The output of photodiode element 109 is fed by line 121 to a second comparator 124 having a preset reference signal input thereto through line 125. The output of comparator 124 is coupled to the enable terminal of comparator 114 by line 126, comparator 124 serving to deactivate the detection circuit in the absence of light.

The circuit for EOS detector 54 is identical to that of SOS detector 53 discussed above.

To permit SOS detector 53 to be used to align laser 22 during servicing or replacement of the laser, as will appear more fully herein, the output of photodiode element 109 is fed through line 129 to one section of a dual BIFET OP AMP 130 of peak responding circuit 131. The voltage signal level obtained is held on capacitor 134 which applies the signal to the second section of the OP AMP 130. Feedback for OP AMP 130 is derived through circuit 135.

In operation, peak responding circuit 131 provides, at the output 136 thereof, a meter readable signal reflecting the peak voltage level of the output signal produced by the detector photodiode element 109 as the laser beam is moved thereacross. Output 136 may be coupled to a suitable meter such as a digital voltage meter (DVM) to permit the voltage level, which reflects the brightness of the scan beam impinging on detector 53, to be read.

EOS detector 54 may similarly be provided with peak responding circuitry 131 either in place of detector 53 or in addition thereto.

Figure 7A:
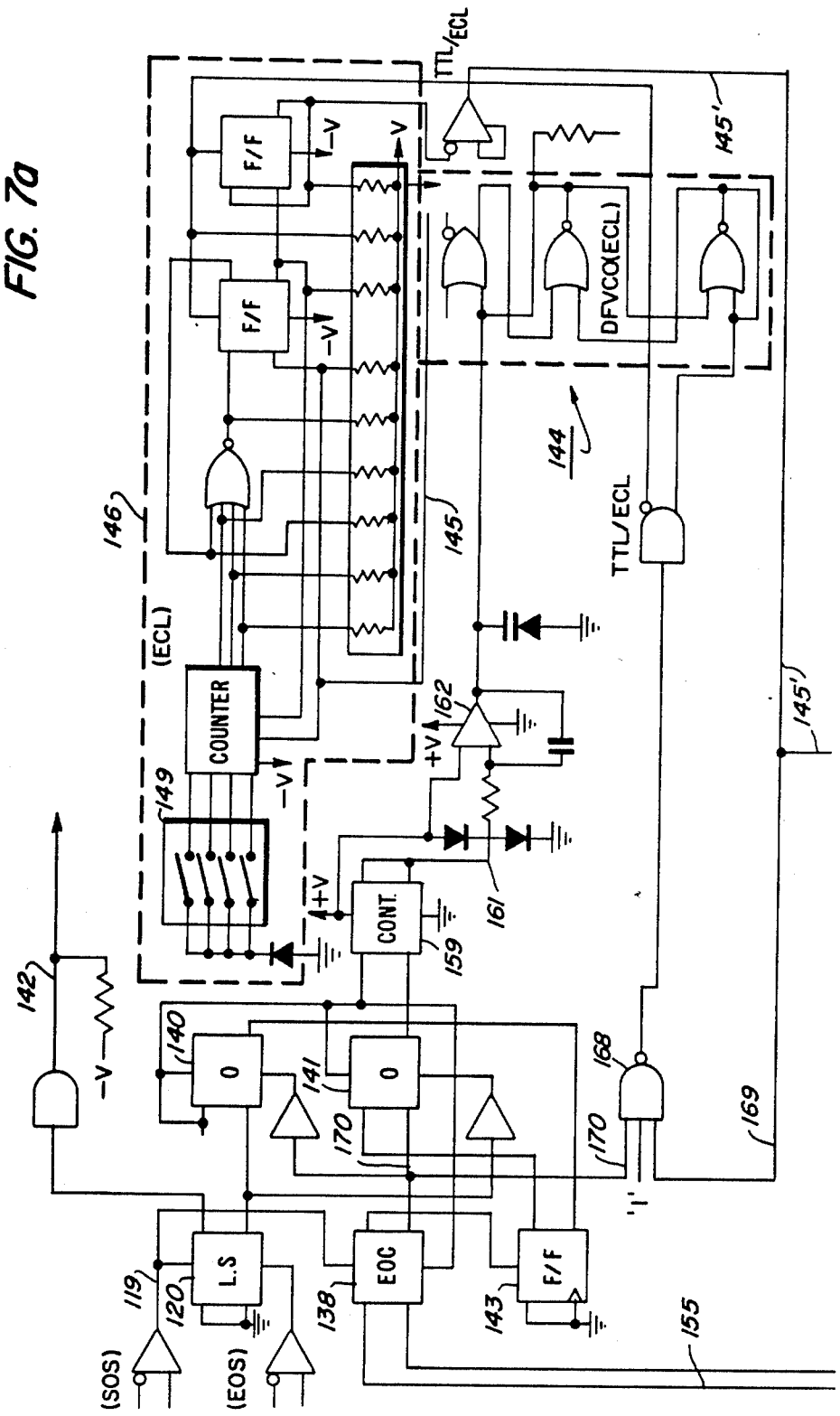
FIG. 7 is a logic circuit diagram showing details of the scanner pixel clock generator.
Figure 7B:
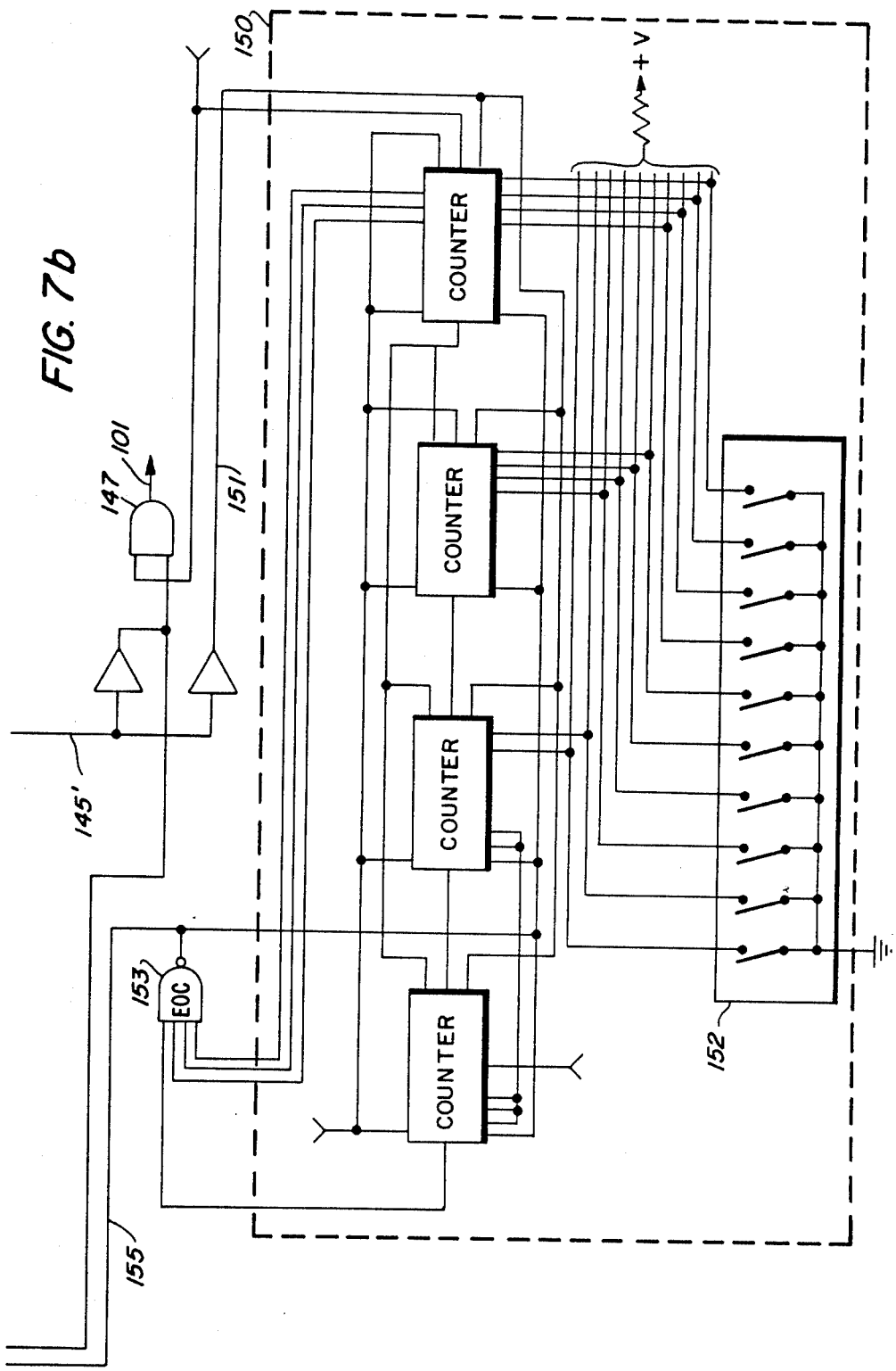

Referring particularly to FIGS. 5, 7a and 7b, the SOS and EOS signals produced by detectors 53, 54 as the laser beam scans thereacross are input to line sync flip-flop 120 of pixel clock 105. Additionally, the SOS signal from detector 53 is input to the set gate of end of count (EOC) flip-flop 138. The output of flip-flop 120, termed the line sync of LS signal herein, is applied through line 139 to the clock and reset gates of phase detector flip-flop pair 140, 141 of pixel clock circuit 105. Additionally, the LS signal from flip-flop 120 is output to the video data source (not shown) through line 142 to synchronize the data source with the scanner 10. The output of EOC flip-flop 138 is applied through line 170 to the reset and clock gates of phase detector flip-flops 140, 141, and to clock limit gate 168, and through line 172 to control flip-flop 143.

A digital voltage controlled oscillator (DFVCO) 144 provides pixel clock pulses, the clock pulse output of DFVCO 144 being fed via lead 145, prescaler circuit 146, and lead 145' to clock output gate 147 (FIG. 7b). Prescaler circuit 146 serves to permit the frequency of the pixel clock pulses output of DFVCO 144 to be reduced, i.e. scaled, to the frequency desired, circuit 146 including a frequency selector 149 to allow the scaling factor of circuit 146 to be manually set.

To enable the number of image pixels in each image line which is determinative of the image size, to be controlled, a divide-by-N counter 150 (FIG. 7b) is provided. Counter 150 is driven by clock pulses from the clock output line 145' of DFVCO 144 input to counter 150 through line 151. Counter 150 is preset to a predetermined count representing the desired image magnification by magnification selector 152. The output of counter 150 controls enabling of end of count (EOC) gate 153, the EOC signal produced by gate 153 when triggered being input through line 155 to EOC flip-flop 138 (FIG. 7a).

Phase detector flip-flops 140, 141 serve to define the interval between the EOC signal, produced by counter 150, and the falling edge of the LS signal produced by EOS detector 54 and to adjust the output frequency of DFVCO 144 in reponse thereto to provide a pixel clock frequency compatible with both the pixel count and the period of the image line. The signal outputs of flip-flops 140, 141 are input to controller 159 which outputs a control signal having a duration proportional to the interval (if any) between the EOC and EOS signals.

The control signal of controller 159 is output through line 161 to filter 162 which acts to both filter and to integrate the signal. The control signal from filter 162 is used to adjust, i.e. raise or lower, the signal output frequency of DFVCO 144 to maintain the EOC and EOS signals colinear.

Pixel clock pulses are also fed to clock limit gate 168 through line 169, line 169 being tapped into pixel clock line 145' for this purpose. The output of EOC flip-flop 138 is coupled to gate 168 through line 170. Clock limit gate 168 serves to prevent disabling of DFVCO 144 and the pixel clock output until the end of a clock pulse, rather than at some intermediate point in the clock pulse.

In operation the clock signal output of DFVCO 144 is set by means of frequency selector 149 of scaler circuit 146 to provide pixel clock pulses at the desired frequency. Additionally, divide-by-N counter 150 (FIG. 7b) is preset by means of magnification selector 152 to the desired number of image pixels per scanned line.

As the scan beam 40 passes across SOS detector 53, the signal generated by detector 53 sets LS flip-flop 120 and EOC flip-flop 138. Setting of EOC flip-flop 138 triggers gate 168 to start DFVCO 144 and initiate input of a line of video image signals or pixels from the data source.

The pixel clock pulses generated by DFVCO 144 following scaling by scaler circuit 146, are output via line 145' to gate 147 and from gate 147 and pixel clock output line 101 to the video data source (not shown). At the same time, the pixel clock pulses are fed to divide-by-N counter 150 through line 151.

As the imaging beam passes across EOS detector 54, the signal from detector 54 resets LS flip-flop 120 to terminate the LS signal, LS flip-flop 120 resetting phase detector flip-flop 141 and pulsing flip-flop 140. Counter 150 on reaching the end of the preset count for which counter 150 is programmed, triggers EOC gate 153 to generate an EOC signal in line 155. On the next pixel clock pulse, EOC flip-flop 138 is pulsed. The signal from flip-flop 138 enables clock limit gate 168 and on the next succeeding pixel clock pulse, gate 168 is triggered to inactivate pixel clock 144. The signal from flip-flop 138 resets phase detector flip-flip 140.

Where phase detector flip-flops 140, 141 are reset at substantially the same time, the signal inputs to controller 159 balance and no clock adjusting signal appears at the output of controller 159. Where the falling edge of the LS signal and the EOC signal occur at different times, the resulting control signal output by controller 159 advances or retards DFVCO 144 in accordance with the interval between the LS and the EOC signals to provide a corresponding adjustment in pixel clock frequency.

Figure 8:
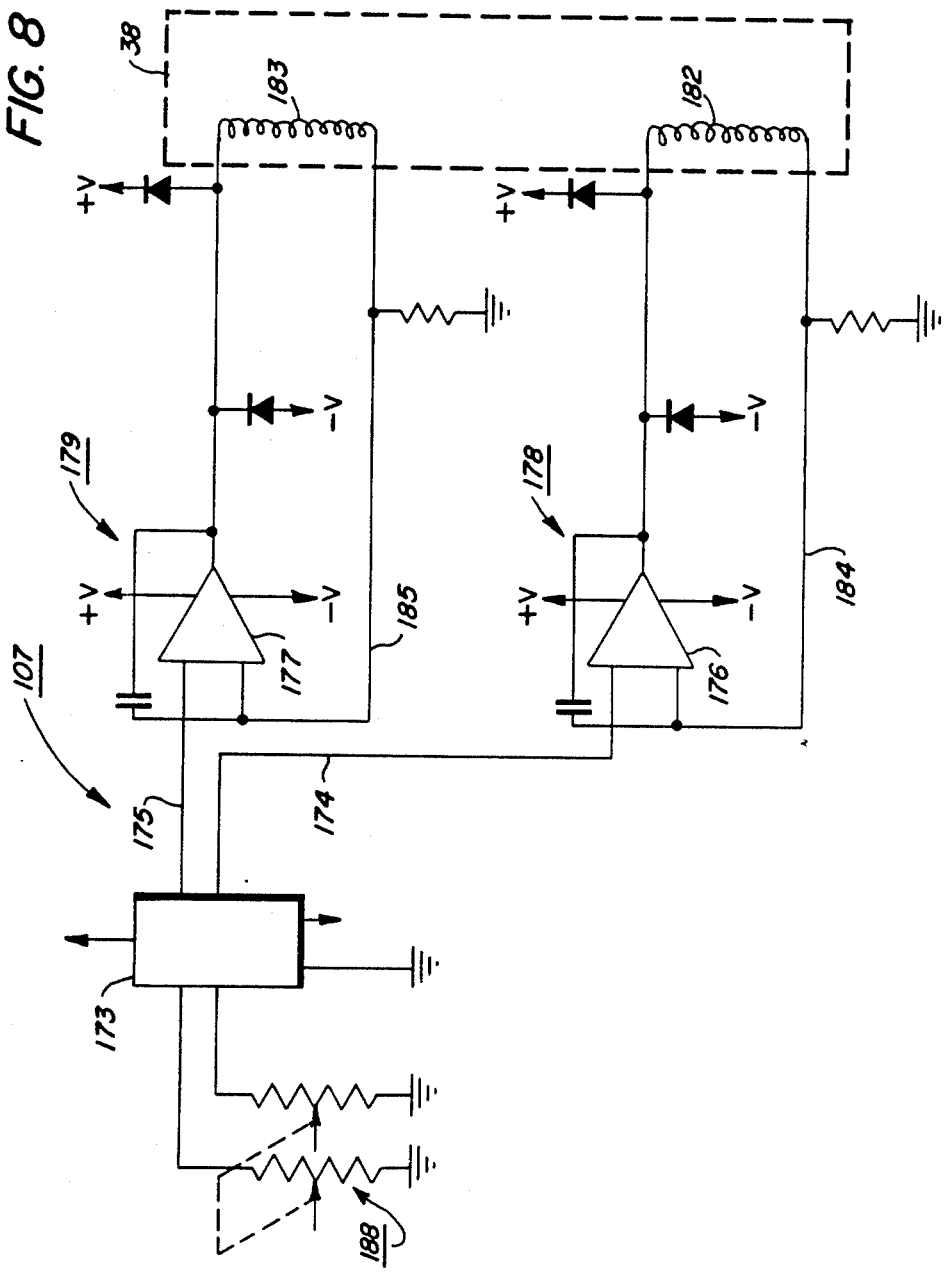
FIG. 8 is a logic circuit diagram showing details of the polygon motor driver.

Referring now to FIG. 8, polygon motor drive circuit 107 includes a quadrature oscillator 173 adapted to generate two sine wave outputs in phased quadrature, referred to herein as sine and cosine signals. The sine and cosine signals are output through lines 174, 175 respectively to amplifiers 176, 177 of linear amplifier circuits 178, 179 where the signals are amplified. The amplified sine and cosine signals are fed to the field windings 182, 183 of the two phase polygon motor 38 to energize windings 182, 183 and operate motor 38.

To maintain polygon speed constant, the current of motor 38 is sensed and the signal fed back by lines 184, 185 to amplifier circuits 176, 177. The return signal serves to control the current output of amplifier circuit pair 178, 179 in accordance with changes in polygon speed to maintain the speed of polygon motor 38 and hence, polygon 35 constant. Adjustable resistor 188 permits the signal output frequency of oscillator 173 and hence the rotational speed of polygon motor 38 and polygon 35 to be adjusted.

Figure 9:
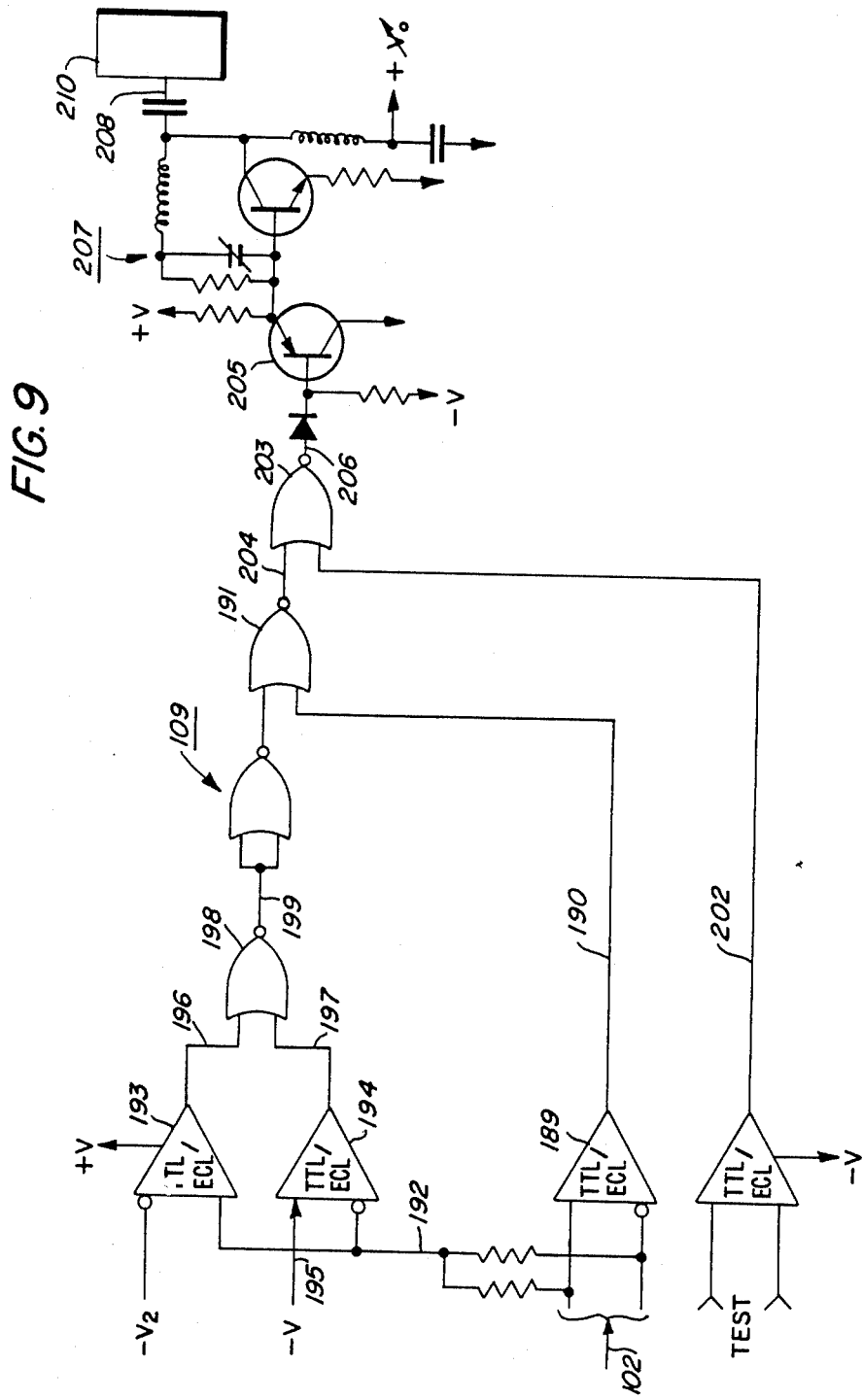
FIG. 9 is a logic circuit diagram showing details of the modulator driver.

Referring particularly to FIG. 9 video image signals output from the video data source to line 102 and modulator driver module 104 are translated by translator 189 and input via line 190 to OR function gate 191. To accommodate shutdown of the data source (not shown) or unplugging of scanner 10, the presence of video image signals is sensed by translator pair 193, 194 via line 192. Translator pair 193, 194 are coupled by lines 195, 195' to suitable voltage reference sources, with the output thereof coupled through lines 196, 197 to OR function gate 198. Gate 198 is coupled by line 199 to gate 191. In the event of a loss of video image signals due to either shutdown of the data source or unplugging of scanner 10, translator 193 or 194 responds and provides a steady state signal to operate driver module 104 and cause modulator 27 to output a first order beam 32.

To permit test images to be input to scanner 10, a test line 202 is provided, test line 202 being coupled to one input of OR function gate 203. Line 204 feeds video image signals output by gate 191 to gate 203. Line 206 couples gate 203 to the control transistor 205 of a single frequency gateable oscillator 207 which serves to produce high frequency signals in output lead 208 to modulator transducer 210 in accordance with the video image signal content.

OPERATION

At startup of scanner 10 power is applied to quadrature oscillator 173 of polygon motor drive circuit 107. The sine and cosine signal output of oscillator 173 triggers linear amplifier pair 178, 179 (FIG. 8) in phase relationship to energize windings 182, 183 of polygon motor 38 and rotate polygon 35 at a constant speed. Laser 22 is energized, the beam 25 emitted by laser 22 being reflected by mirror 24 to modulator 27. It is understood that solenoid 23 is also energized to withdraw shutter 21 by suitable circuit means (not shown).

Video image signals from the video data source are input through line 102 to drive module 104 of modulator 27 in response to the line sync (LS) signals, the image signals being clocked by clock pulses output by pixel clock 105. The video image signals are amplified by amplifier 189 and input via line 190, gate 191, line 204, and gate 203 to control transistor 205 of the gateable oscillator 207 (FIG. 9). At other times, i.e. between lines, a steady state signal is applied to the modulator drive module 104 by translator 143 or 144 via line 196 or 197, gate 198, line 199, and gate 191 (FIG. 9).

Oscillator 207 of modulator drive module 104 normally outputs a RF signal to line 208 and transducer 210 of modulator 27. As a result, transducer 210 generates a pulsed acoustic wave within the modulator material which causes a periodic change in the index of refraction of the modulator 27 and deflection of the laser beam 25 to provide the first order beam 32. The angle of deflection is dependent on the acoustical frequency and the angle between the laser beam 25 and the acoustical beam. In the absence of an acoustic wave, the laser beam 25 passes through modulator 27 (zero order beam 31) and is intercepted by beam stop 29. In that event, exposure of the previously charged photoconductor surface II to beam 25 is prevented and the charged area is developed as will be understood by those skilled in the art. Where the acoustic wave is present, beam 25 is deflected into the optical path O leading to the photoreceptor II.

In the exemplary arrangement shown, where the video signal is low (i.e. "0"), the RF signal produced by oscillator 207 is output to transducer 210. The acoustic waves generated by transducer 210 deflect the laser beam to provide the first order beam 32. The beam passes through the scanner optical path and impinges on photoreceptor II, discharging the area struck and preventing development thereof. When the video signal is high (i.e. "1"), control gate 205 is triggered to interrupt the RF signal output of oscillator 207. This produces a zero order beam 31 which passes directly through modulator 27 to beam stop 29.

Between image lines, when input of video signals is interrupted, translator 194 responds to provide a steady state video signal (i.e., "0"). As a result, the RF signal output of oscillator 207 to transducer 210 deflects the laser beam to provide first order beam 32 between lines.

As the beam 32 is swept across photoreceptor II, SOS detector 53 produces a signal which sets LS flip-flop 120 and EOC flip-flop 138 (FIG. 7a, 7b). Setting of LS flip-flop 120 generates a line sync (LS) signal which is output through lead 142 to enable the data source and initiate transmission of video image signals to line 102. At the same time, the signal from EOC flip-flop 138 enables DFVCO 144. Pixel clock pulses generated by DFVCO 144 are output via lead 145, prescaler circuit 146, lead 145' and gate 147 to clock output lead 101 and the video data source. Clock pulses are also output through lead 151 to divide-by-N counter 150 which, following a preset count equal to the number of image signals or pixels in the image line enables EOC gate 153. EOC gate 153 resets EOC flip-flop 138 to terminate operation of DFVCO 144. Phase detector flip-flop 140 is reset at the same time.

As the image beam sweeps across EOS detector 54, the signal from detector 54 resets LS flip-flop 120 to terminate input of video image signals the video data source and reset phase detector flip-flop 141. As described earlier, where resetting of phase detectors 140, 141 occurs at different intervals, a signal is output by controller 159 to either speed up or slow down DFVCO 144 and correlate the output of pixel clock pulses with the sweep velocity of the beam 32.

During operation, the light beam 25 emitted by laser 22 is turned through an arc of more than 90° (in the horizontal plane) and reflected downwardly by fold mirror 24 to the inlet of modulator 27 (FIGS. 1-3). As described, modulator 27 either directs the beam against beam stop 29 (zero order beam 31) or to fold mirror 30 (first order beam 32) in accordance with the content of the video image signals input thereto. The first order beam 32 striking mirror 30 is reflected back in the direction of laser 22 but along a lower level of scanner 10 to power mirror 33 disposed in the area below laser 22. Mirror 33 reverses (i.e. folds) the beam 32 and turns the beam upwardly to cause the beam to impinge against the mirror-like facets 36 of the rotating polygon 35. Polygon 35 sweeps the light beam through a preset scan arc and reverses (i.e. folds) the beam direction so that the scan beam 40 passes through lens 45 to power mirror 33. As will be understood, lens 45 serves to focus the scan beam 40 onto the photoconductive surface 19. As the scan beam 40 emitted from lens 45 sweeps across mirror 33, and beam is reversed (i.e. folded) and directed forward by mirror 33 to fold mirror 47. Mirror 47 turns the scan beam 40 downwardly through scan slot 49 to impinge on the photoreceptor II.

As the scan beam 40 is swept by polygon 35 through the scan arc, pickoff mirrors 50, 51 intercept the beam. Light reflected by mirros 50, 51 impinges on SOS and EOS detectors 53, 54 to provide the aforedescribed SOS and EOS signals.

Where replacement or off line servicing is required, the laser assembly 15 is removed from scanner 10 by releasing spring retainers 83, 86 and withdrawing the laser assembly 15. Separation occurs at the spherical bearing halves 64, 65 (FIGS. 1-4).

When replacing or installing a new laser assembly 15, the procedure is reversed. However, following replacement, a critical alignment of the laser beam with the scanner optical path O must be made if scanner 10 is to operate correctly.

For realignment following replacement or servicing, the laser assembly 15 is positioned so that bearing half 64 of spherical bearing 58, which is attached to laser assembly 15, is fitted over the bearing half 65 fixed to the scanner frame. The cylindrical exterior of the laser housing adjacent the opposite end thereof rests against rear support member 77 and the adjusting screws 81 projecting therefrom. Spring retainers 83, 86 are brought into place to bias the laser assembly against support member 77 and screws 81 thereof, and to force the laser assembly forward to bring bearing halves 64, 65 of spherical bearing 58 into mating contact.

As described, laser plasma tube 22 of laser assembly 15 is prealigned such that on mounting of the laser assembly in place on scanner 10, the beam 25 emitted by laser 22 intersects point P on the scanner optical axis O which is also the center of rotation of spherical bearing 58. Following mounting of the laser assembly 15 on scanner 10, laser 22 is turned on and a suitable meter, i.e. a DVM, coupled to the output lead of peak responding circuit 131. It is understood that either or both detectors 53, 54 may be provided with peak responding circuit 131 and in the case where both detectors incorporate circuit 131, either or both detectors are used to effect alignment. Polygon motor 38 is energized to rotate polygon 35.

In the absence of a video signal, a steady state signal is produced by translator 193 or 194 to cause the RF signal output of oscillator 173 to be applied to transducer 210. The RF signal input to transducer 210 generates an acoustic wave in the modulator material to deflect the laser beam and provide first order beam 32 as described heretofore. By measuring the output of peak responding circuit 131, which is a measure of the intensity of the laser beam, as the beam passes across the detector, the laser assembly 15 may be incrementally adjusted by means of screws 81 until a maximum meter reading, representing the maximum intensity, is obtained. In this process, it is understood that spherical bearing 58 permits omnidirectional pivoting of the laser assembly 15 about the point (P) until maximum beam intensity, representing axial alignment of the laser beam with the scanner optical axis is achieved.

It is understood that the aforedescribed laser supporting mechanism serves to retain, i.e. lock, the laser assembly in position once the critical alignment has been achieved. And while a ball point type of support for laser assembly 15 is illustrated herein, other support types permitting pivoting of the laser assembly 15 about a predetermined point may be envisioned.

While the invention has been described with reference to the structure disclosed, it is not confined to the details set forth, but is intended to cover such modifications or changes as may come within the scope of the following claims:

We claim:

1. A symmetrical optical system for a raster scanner which minimizes the need for cross scan corrections and avoids the use of a toroidal type lens, comprising:

a plurality of reflective surfaces cooperable to form an optical path for causing a beam of light to impinge on the object to be scanned, said reflective surfaces including a rotatable deflector for scanning said beam through a preset scan arc, and at least one mirror for guiding said beam to said deflector so that said beam strikes said deflector once, said deflector reflecting said beam directly back to said mirror whereby to provide a dual pass optical path between said deflector and said mirror, said mirror reflecting the beam from said deflector toward the object to be scanned.

2. The optical system according to claim 1 in which said deflector comprises a polygon.

3. The optical system according to claim 1 in which said reflective surfaces cooperate to form one input and one output optical path to and from said deflector, said input and output paths being tangentially offset from one another to avoid interference between said input and output paths.

4. In a raster scanner, the combination of:

a source of a high intensity beam of light;

mirror means forming a compact folded optical path between said light source and the object to be scanned;

said mirror means including a rotatable polygon having a plurality of mirror-like facets for scanning a beam input thereto through an arc as said polygon rotates; and plural mirrors for guiding said light beam to said polygon facets and for guiding the scanning beam output by said polygon to the object to be scanned; said mirrors guiding said beam so that said beam strikes said polygon once, said mirror means folding said beam so that the light beam input to said polygon projects along an axis tangent to the axis of said scanning beam output by said polygon and at least two light responsive detectors in the path of said scanning beam for generating start of scan and end of scan signals as said scanning beam sweeps thereacross;

said mirror means including pickoff mirrors for guiding said scanning beam to said detectors, said detectors cooperating to provide a predetermined scan arc.

5. The raster scanner according to claim 4 in which said beam is folded at least twice by said mirror means.

6. The raster scanner according to claims 4 or 5 including lens means for focusing said beam onto the object to be scanned.

* * * * *